United States Patent
Matsuno

[11] Patent Number: 5,890,398
[45] Date of Patent: Apr. 6, 1999

[54] DRIVE PLATE FOR AUTOMOTIVE VEHICLE

[75] Inventor: Mitsuyoshi Matsuno, Kosai, Japan

[73] Assignee: Fujikiko Kabushiki Kaisha, Tokyo, Japan

[21] Appl. No.: 906,128

[22] Filed: Aug. 5, 1997

Related U.S. Application Data

[63] Continuation of Ser. No. 535,555, Sep. 28, 1995, abandoned.

[30] Foreign Application Priority Data

Sep. 30, 1994 [JP] Japan .................... 6-261640

[51] Int. Cl.$^6$ .................................................. F16F 15/26
[52] U.S. Cl. .......................... 74/572; 464/182; 403/337
[58] Field of Search ................ 74/572, 595; 403/337, 403/220; 464/182, 147, 155

[56] References Cited

U.S. PATENT DOCUMENTS

| | | | |
|---|---|---|---|
| 1,322,474 | 11/1919 | Allen | 464/155 X |
| 3,985,000 | 10/1976 | Hartz | 403/220 X |
| 4,913,267 | 4/1990 | Campbell et al. | 74/572 X |
| 4,914,949 | 4/1990 | Andra et al. | 74/572 X |
| 5,197,352 | 3/1993 | Haikawa | 74/572 X |
| 5,323,665 | 6/1994 | Rediker, Jr. | 74/572 X |

FOREIGN PATENT DOCUMENTS

| | | |
|---|---|---|
| 1.021.778 | 2/1953 | France . |
| 32 22 119 | 10/1983 | Germany . |
| 43 12 233 | 5/1994 | Germany . |
| 2 061 449 | 5/1981 | United Kingdom . |

OTHER PUBLICATIONS

Patent Abstract of Japan: JP-A-60 241 568, Nov. 30, 1985.
Patent Abstract of Japan: JP-A-05 039837, Feb. 19, 1993.

*Primary Examiner*—Charles A. Marmor
*Assistant Examiner*—Mary Ann Battista
*Attorney, Agent, or Firm*—Jones & Askew

[57] ABSTRACT

A drive plate (E) for an automotive vehicle for transmitting a torque from a crankshaft (6) to a torque converter (7), while absorbing a thrust load applied from the torque converter to the crankshaft is formed with: a central mount portion (11) for mounting a crankshaft; an outer gear (20) formed in an outermost circumference of the drive plate; a plurality of weight reducing holes (30) formed between the central mount portion and the outer gear at regular angular intervals; and a plurality of the outer mount portions (12) for mounting a torque converter (7) formed near an outer circumference of the drive plate at regular angular intervals. In particular, the outer mount portions (12) are formed in such a way as to project radially inward from the outer gear (20) into the weight reducing holes (30), respectively. Since the virtual bending radius (deformation length L) of the drive plate can be increased, the bending angle (DA1) can be reduced when a thrust load is applied from the torque converter to the drive plate, so that it is possible to reduce a bending stress concentrated at the central mount portion (11) as small as possible, for prevention of the drive plate from being damaged.

3 Claims, 14 Drawing Sheets

DRIVE PLATE FOR AUTOMOTIVE VEHICLE

This is a continuation of application Ser. No. 08/535,555 filed Sep. 28, 1995, now abandoned.

BACKGROUND OF THE INVENTION

1. Technical Field

The present invention relates to a drive plate for an automotive vehicle, and more specifically to a drive plate for linking an engine crankshaft with a torque converter of an automatic transmission. Here, the drive plate implies a plate disposed midway in a transmission route from an engine to vehicle wheels in an automotive vehicle.

2. Description of the Related Art

FIGS. 1A, 1B and 1C show an example of a prior art drive plate 1 for an automotive vehicle. The drive plate 1 is composed of a body portion 2 formed by pressing a metal plate and a ring gear 3 fixed integral with the outer circumference of the body portion 2 by welding. Further, the body portion 2 is formed with a central mount portion 4 fixed to a crankshaft 6 and an outer circumferential mount portion fixed to a torque converter 7, as depicted in FIG. 1B. Further, as shown in FIG. 1A, a plurality (e.g., eight) of crankshaft mounting holes 4a are formed in the central mount portion 4 at regular angular intervals along a concentric circle, and a plurality (e.g., four) of torque converter mounting holes 5 are also formed in the outer circumferential mount portion at regular angular intervals along another concentric circle. In addition, the central mount portion 4 and the outer circumferential mount portion are dislocated in an axial direction of the drive plate 1 by deforming an intermediate portion A (See FIG. 1A) between the two by a drawing processing. Further, in FIG. 1A, 2a denotes an innermost hole through which the crank shaft is passed, and 2b denotes additional holes formed to reduce the weight of the drive plate 1.

In assembly of the vehicle drive plate 1, an end portion 6a of the crankshaft 6 (See FIG. 1B) is fixed to the drive plate 1 with a plurality of mount bolts 6b fitted into the crank mount holes 4a; and a boss portion 7a of the torque converter 7 is fixed to the drive plate 1 with a plurality of mount bolts 7b fitted into the converter mount holes 5. After assembly, therefore, it is possible to transmit the torque of the crankshaft 6 to the torque converter 7 and further to absorb a thrust load of the torque converter 7.

In the above-mentioned prior art drive plate 1, however, whenever a thrust load is applied from the torque converter 7 to the drive plate 1, since being formed by a drawing press, the intermediate area A is easily bent. On the other hand, since being formed rigid, the outer area B (See FIG. 1A) is hardly deformed. Consequently, when a thrust load is applied to the drive plate 1, only the intermediate portion A is deformed, and the outer area B is not deformed, as shown by phantom lines shown in FIG. 1C. In other words, since the virtual bending radius (i.e., a deformation distance) L of the drive plate 1 is small, the intermediate area A is deformed at a relatively large deflection angle DA. Under these conditions, although the above-mentioned deformation can absorb the thrust load applied from the torque converter 7 to the drive plate 1, when this deflection angle DA increases beyond a predetermined limit, since a bending stress generated in the vicinity of the central mount portion 6 is concentrated excessively, there exists a problem in that the bending stress exceeds an allowable stress limit, with the result that the central mount portion 4 of the crankshaft 6 is damaged or broken.

SUMMARY OF THE INVENTION

With these problems in mind, therefore, it is the object of the present invention to provide a drive plate for an automotive vehicle, which can reduce the bending stress generated when a thrust load is applied from the torque converter to the drive plate, that is, in the axial (thrust force application) direction of the drive plate, as effectively as possible.

To achieve the above-mentioned object, the present invention provides a drive plate for an automotive vehicle for transmitting a torque from a crankshaft to a torque converter, while absorbing a thrust load applied from the torque converter to the crankshaft, formed with: a central mount portion (11) for mounting a crankshaft; an outer gear (20) formed in an outermost circumference of the drive plate; a plurality of weight reducing holes (30) formed between said central mount portion and said outer gear at regular angular intervals; and a plurality of the outer mount portions (12) for mounting a torque converter (7) formed near an outer circumference of the drive plate at regular angular intervals in such a way as to project radially inward from the outer gear (20) into said weight reducing holes (30), respectively.

Further, it is preferable that said outer gear (20) is formed by directly engraving teeth in an outer annular portion formed simultaneously when a body portion (10) of the drive plate is formed.

Here, said weight reducing holes (30) are each formed into a sectorial shape having outer and inner arc portions (30c, 30c), and each of said outer mount portion (12) projects radially inward into each of the sectorial weight reducing hole (30) at a middle of the outer arc portion (30b) thereof. Further, the outer mount portions (12) and said weight reducing holes (30) of the same number are arranged radially symmetrically with respect to the center of the drive plate one-to-one corresponding relationship with respect to each other.

Further, it is preferable that the drive plate is further formed with a plurality of circular through holes (31) arranged between said two sectorial weight reducing holes (30). Further, it is preferable that the inner arc portions (30c) of the sectorial weight reducing holes (30) are formed in close proximity to said central mount portion 11 and further the outer arc portions (30b) of the sectorial weight reducing holes (30) are formed in close proximity to said outer gear (20).

In the drive plate according to the present invention, since the deformation distance L1 (the virtual bending radius) can be increased by forming the converter mounting holes as radially outward as possible by best use of the weight reducing holes, when the converter mounting portion of the driver plate is deformed toward the crankshaft in the axial (thrust) direction thereof, it is possible to reduce the deflection angle as small as possible, so that the bending stress so far concentrated at the central mount hole for mounting the crankshaft can be reduced markedly, thus preventing the central mount portion of the drive plate from being damaged.

DETAILED DESCRIPTION OF THE EMBODIMENTS

Embodiments of the drive plate according to the present invention will be described hereinbelow with reference to the attached drawings.

Figure 2A:
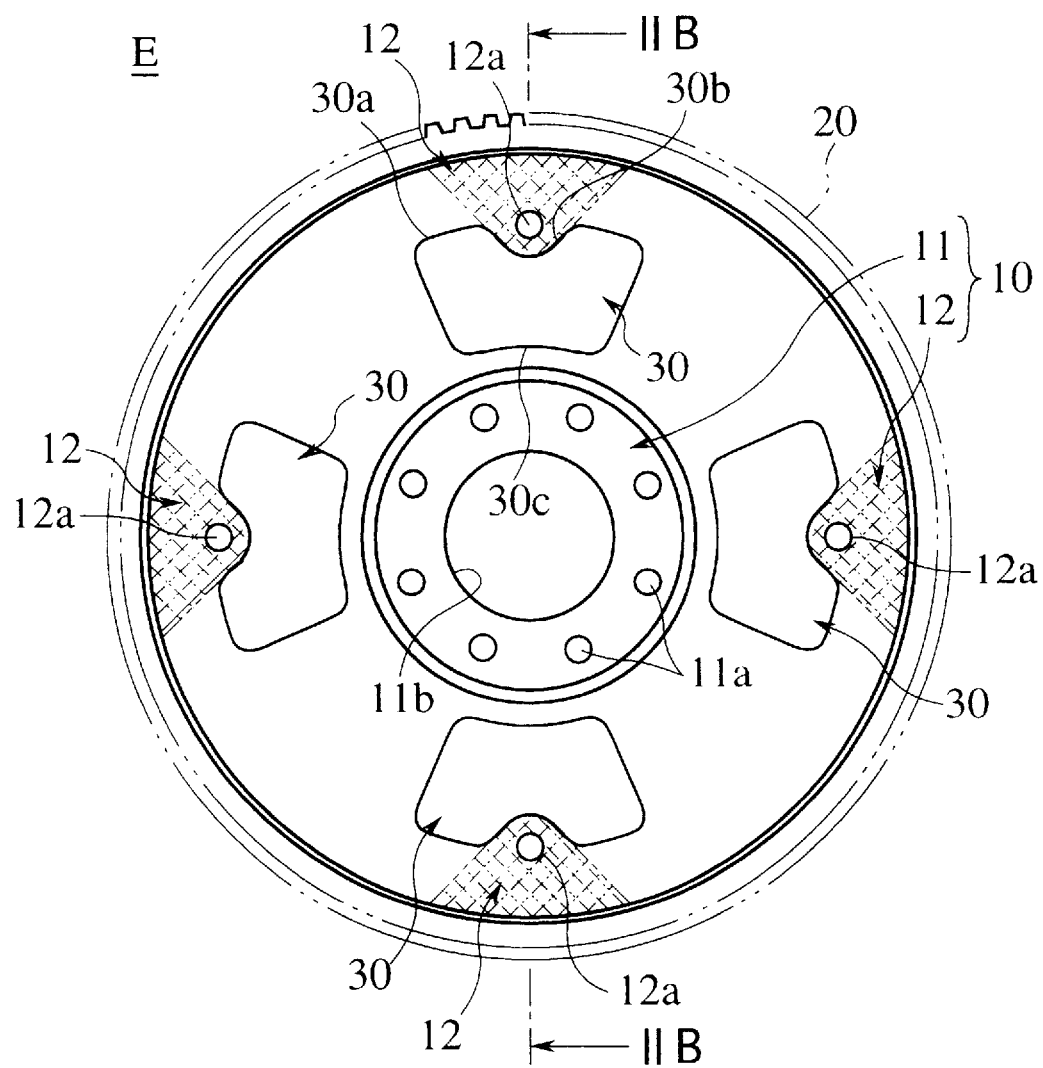
FIG. 2A is a front view showing a first embodiment of the drive plate for an automotive vehicle according to the present invention.
Figure 2B:
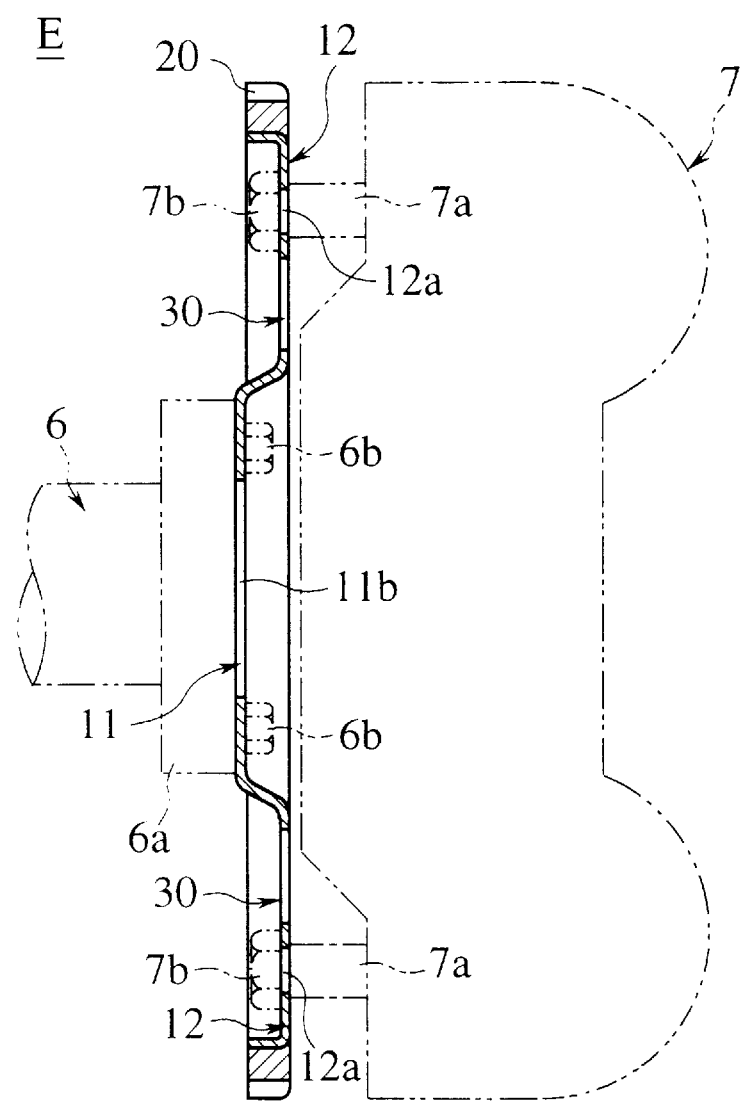
FIG. 2B is a cross-sectional view taken along the line IIB—IIB in FIG. 2A.
Figure 2C:
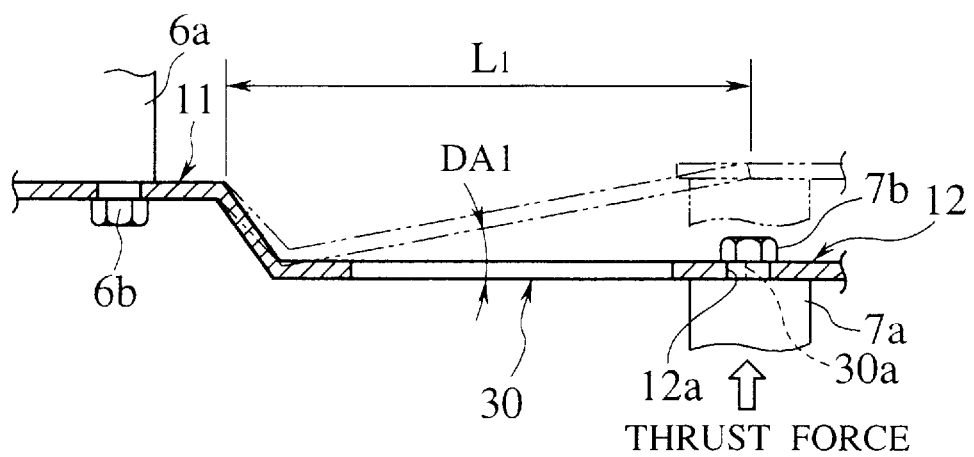
FIG. 2C is an illustration for assistance in explaining the deformation of the drive plate shown in FIGS. 2A and 2B.

First embodiment of the drive plate E is shown in FIGS. 2A, 2B and 2C.

As shown in FIGS. 2A and 2B, a drive plate E is composed of a central mount portion 11 fixed to a crankshaft 6 and an outer circumferential mount portion 12 fixed to a torque converter 7. Further, an outer gear 20 is formed on the outermost circumferential surface of the drive plate E. In addition, a plurality (e.g., four) of weight reducing holes 30 are formed in the intermediate portion (between the central mount portion 11 and the outer mount portion 12) of the drive plate E at regular angular intervals. Therefore, the drive plate E can transmit a torque of the crankshaft 6 to the torque converter 7, and further can absorb the thrust load applied from the torque converter 7 to the drive plate E.

Figure 1A:
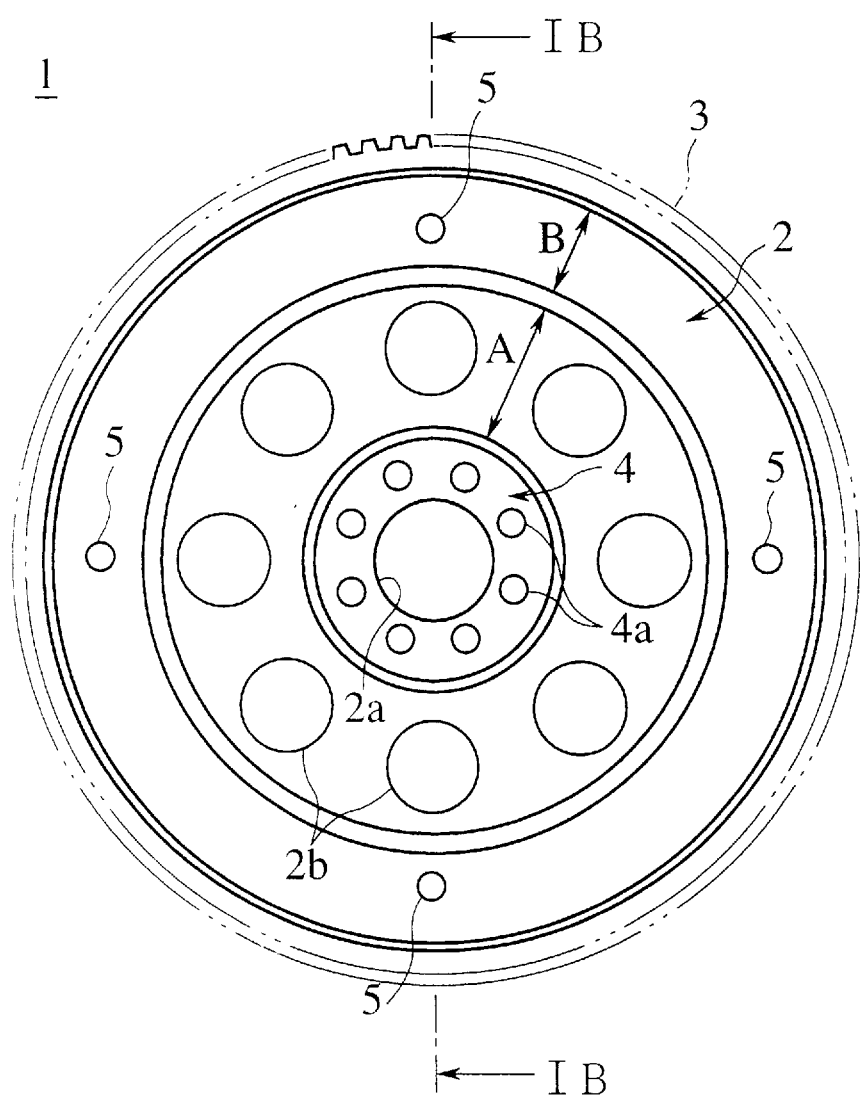
FIG. 1A is a front view showing a prior art drive plate for an automotive vehicle.
Figure 1B:
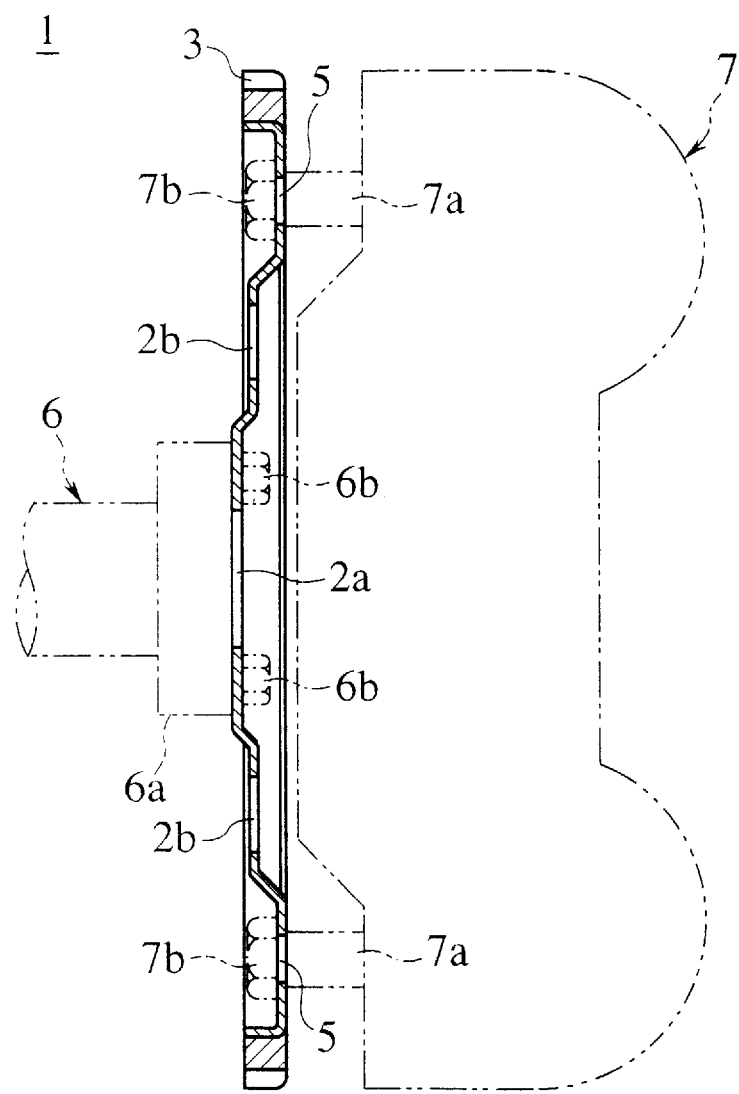
FIG. 1B is a cross-sectional view taken along the line IB—IB in FIG. 1A.

The feature of this first embodiment is that a plurality (e.g., four) of outer mount portions 12 for mounting a torque converter 7 are formed along an outer circumference of the drive plate E at regular angular intervals in such a way that each of the outer mount portions 12 projects radially inward from the outer gear 20 to each of the weight reducing holes 30 (as shown in FIG. 2A), which is different from the prior art drive plate E formed with an intermediate portion A drawn or deformed by a drawing press (as shown in FIG. 1A).

In more detail, the drive plate E shown in FIG. 2A is composed of a body portion 10 formed by pressing (plastic processing) a metallic plate and an outer gear 20 formed in the outer circumference of the body portion 10. Further, the body portion 10 is formed with a central mount portion 11 fixed to a crankshaft 6 and a plurality of outer mount portions 12 fixed to a torque converter 7, as shown in FIG. 2B.

Further, as shown in FIG. 2A, a plurality (e.g., eight) of crankshaft mounting holes 11a are formed in the central mount portion 11 at regular angular intervals along a concentric circle.

Further, a plurality (e.g., four) of outer mount portions 12 for a torque converter 7 are formed along an outer circumference of the drive plate E at regular angular intervals in such a way that each of the outer mount portions 12 projects radially inward from the outer gear 20 to each of the weight reducing holes 30, as shown by meshed (cross-hatched) portion in FIG. 2A. Further, one torque converter mounting hole 12a is formed in each outer mount portion 12.

Further, in FIG. 2A, a through hole 11b is formed at the center of the central mount portion 11 for mounting the crankshaft 6.

The weight reducing holes 30 are each formed into a sectorial (fan) shape in such a way as to be symmetrical right and left and up and down with respect to a diameter line passing through the center of the central mount portion 11 and the center of each of the converter mounting holes 12a. Further, each weight reducing hole 30 is formed with a radially outermost arc portion 30a arranged on a concentric circle passing through the center of the converter mounting hole 12a and with a middle radially concave portion 30b so as to form an inner part of each outer mount hole 12 for mounting the torque converter 7. Further, each innermost arc portion 30c of each weight reducing hole 30 is arranged on a concentric circle of the central mount portion 11 for mounting the crankshaft 6 in the vicinity of the central mount portion 11.

In the same way as with the case of the prior art drive plate E, in assembly of the vehicle drive plate E, as shown in FIG. 2B, an end portion 6a of the crankshaft 6 is fixed to the drive plate E with a plurality of mount bolts 6b fitted into the crank mount holes 11a; and a boss portion 7a of the torque converter 7 is fixed to the drive plate E with a plurality of mount bolts 7b fitted into the converter mount holes 12a. After assembly, therefore, it is possible to transmit a torque of the crankshaft 6 to the torque converter 7 and further to absorb a thrust load of the torque converter 7 applied from the torque converter 7 to the drive plate E.

Figure 1C:
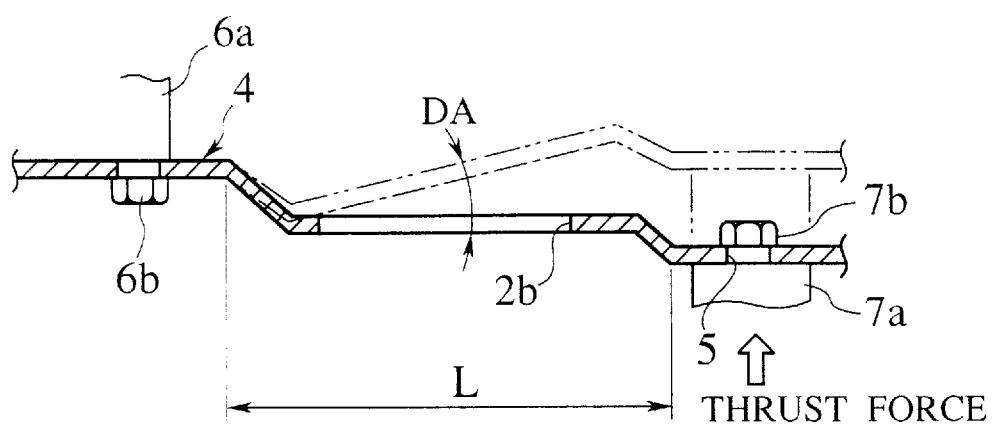
FIG. 1C is an illustration for assistance in explaining the deformation of the prior art drive plate.

In the drive plate E as described above, when a thrust load is applied from the torque converter 7, since the outer mount portion 12 for mounting the torque converter 7 are formed in the vicinity of the weight reducing holes 30 and by best use of the presence of the weight reducing holes 30, respectively, the thrust load is applied to the concentric circle portion along the outermost arc portion 30a of the weight reducing holes 30, so that the drive plate E is deformed as shown by phantom lines shown in FIG. 2C. As a result, it is possible to increase the virtual bending radius (deformation distance) L1 markedly, as compared with the deformation distance L (shown in FIG. 1C) of the prior art drive plate E. In addition, since the outer portion of the drive plate E for mounting the torque converter 7 can be deformed (not rigid as with the case of the prior art), it is possible to prevent a bending stress from being concentrated only at the central mount portion 11 for mounting the crankshaft 6. As a result, the deflection angle DA1 can be reduced smaller than that DA shown in FIG. 1C, so that the bending stress generated in the vicinity of the central mount portion 11 for mounting the crankshaft 6 can be reduced, and thereby the drive plate E can be prevented from being damaged or broken.

Figure 3A:
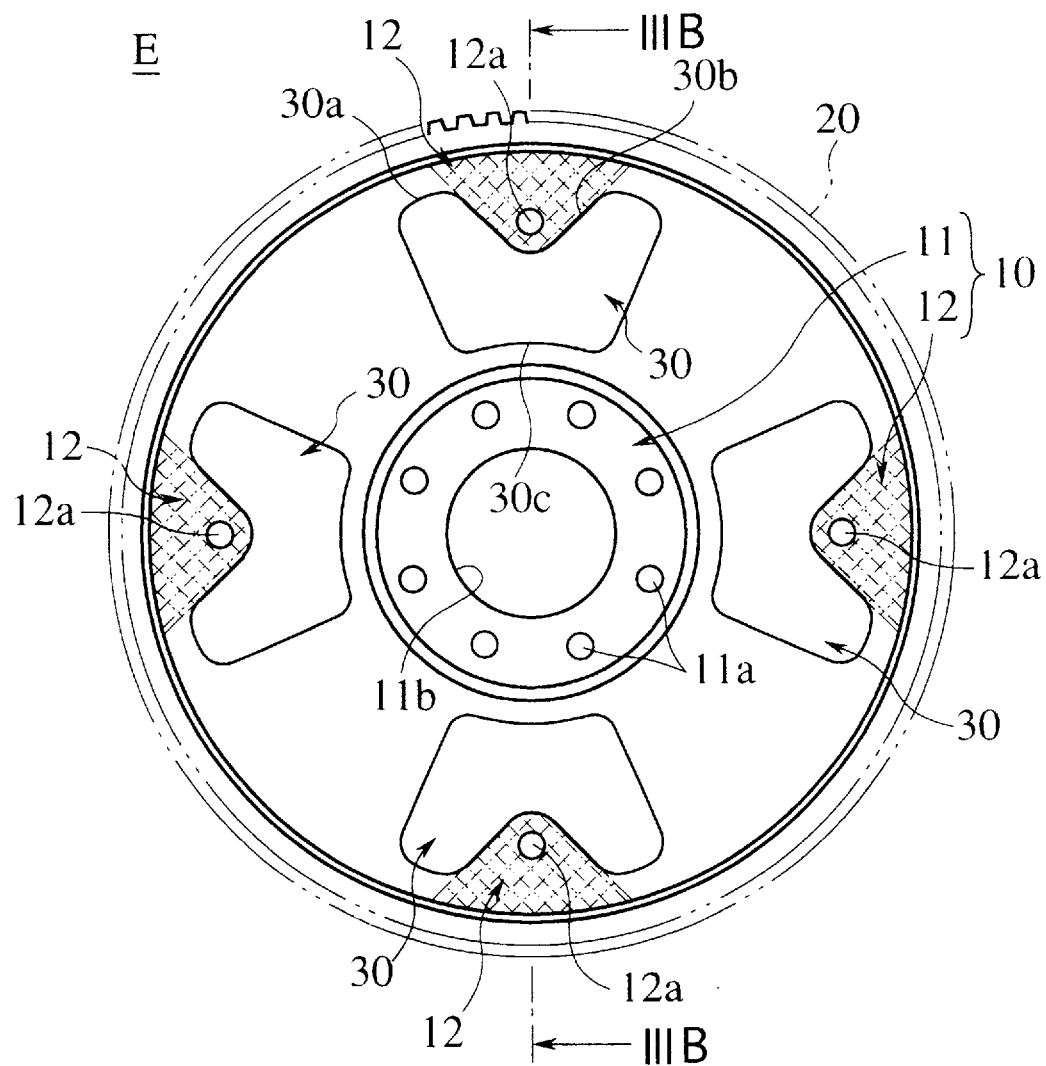
FIG. 3A is a front view showing a second embodiment of the drive plate for an automotive vehicle according to the present invention.
Figure 3B:
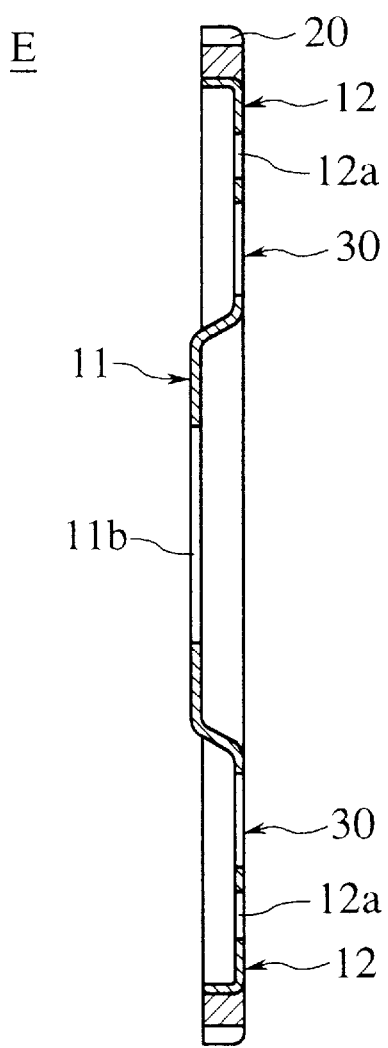
FIG. 3B is a cross-sectional view taken along the line IIIB—IIIB in FIG. 3A.

FIGS. 3A and 3B show a second embodiment of the drive plate E for an automotive vehicle according to the present invention. In this embodiment, the outermost arc portion 30*a* of the weight reducing holes 30 are located outward from a concentric circle passing through the converter mounting holes 12*a* to the outer gear (20) side, so that it is possible to further lengthen the deformation distance L1 and thereby to reduce the deflection angle DA1. As a result, the bending stress concentrated at the drive plate E can be further reduced.

Figure 4A:
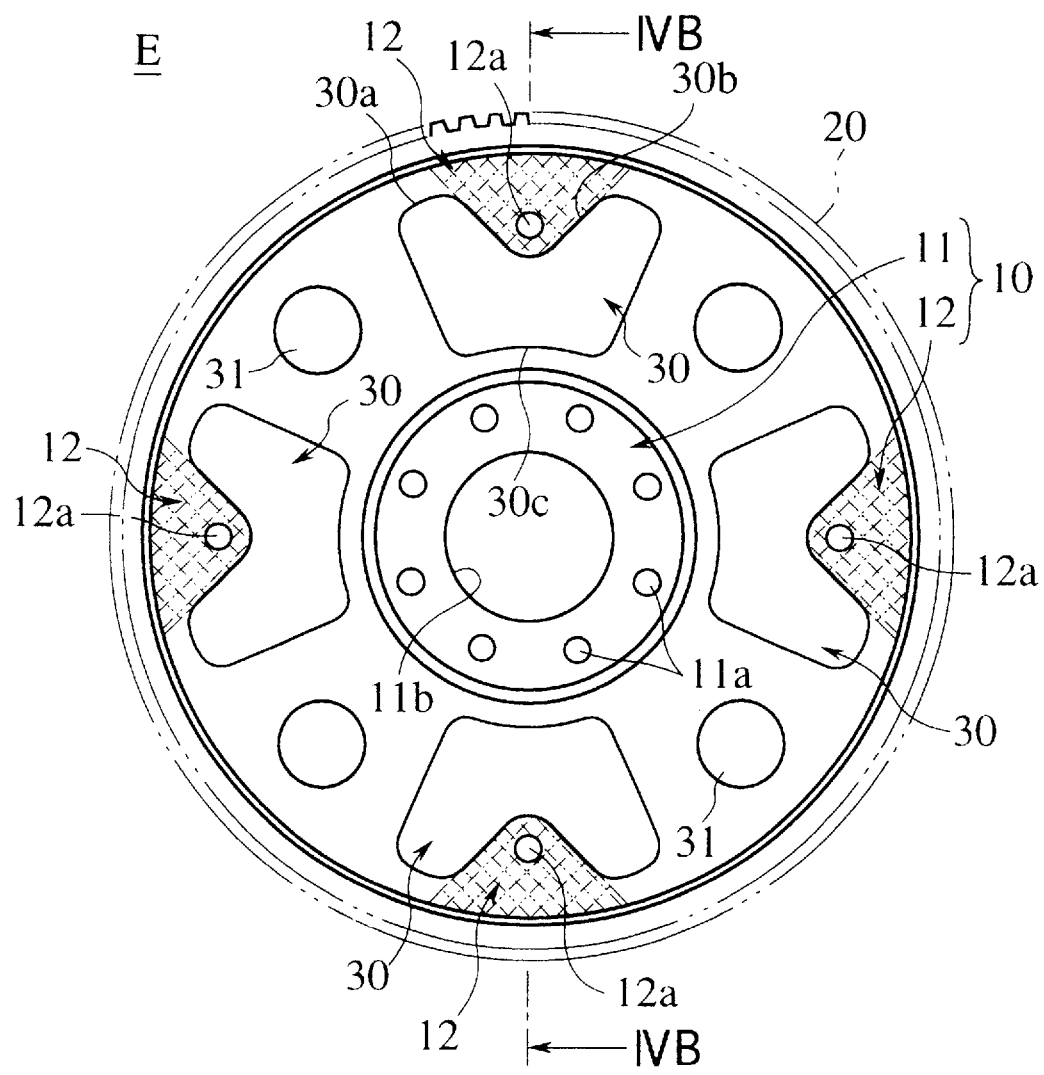
FIG. 4A is a front view showing a modification of the second embodiment of the drive plate for an automotive vehicle according to the present invention.
Figure 4B:
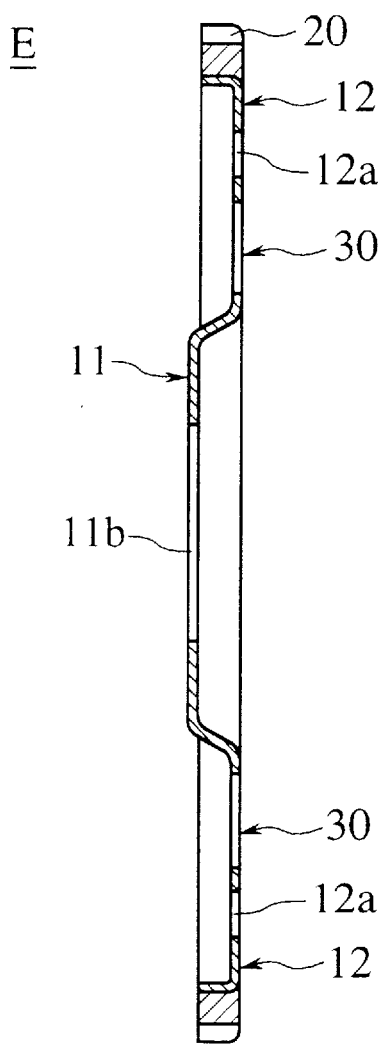
FIG. 4B is a cross-sectional view taken along the line IVB—IVB in FIG. 4A.

FIGS. 4A and 4B show a modification of the second embodiment, in which a plurality (e.g., four) through holes 31 are additionally formed between two adjacent weight reducing holes 30, respectively. In this modification, since the bending stress concentrated at the central portion of the drive plate E can be further decentralized, it is possible to further reduce the bending stress generated at the drive plate E.

Figure 5A:
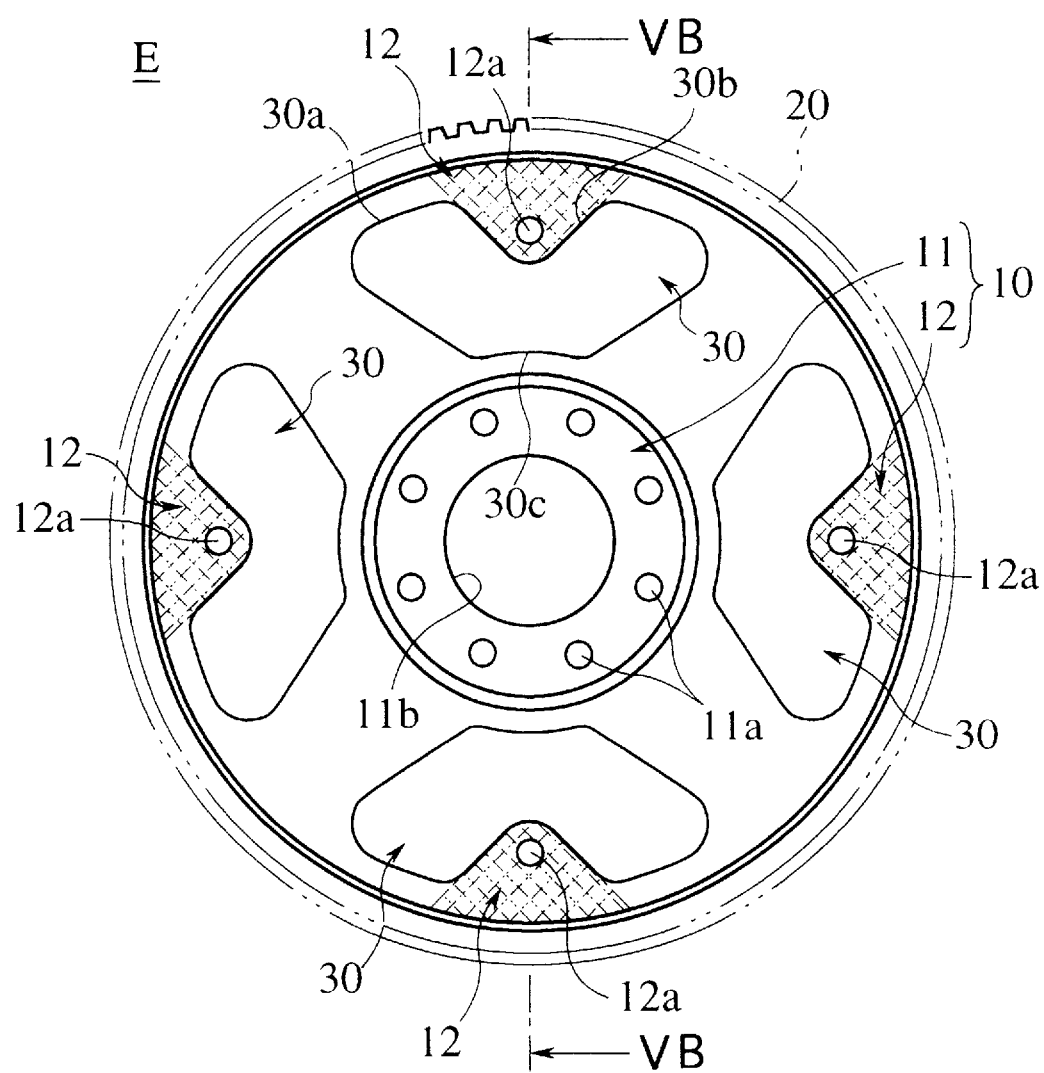
FIG. 5A is a front view showing a third embodiment of the drive plate for an automotive vehicle according to the present invention.
Figure 5B:
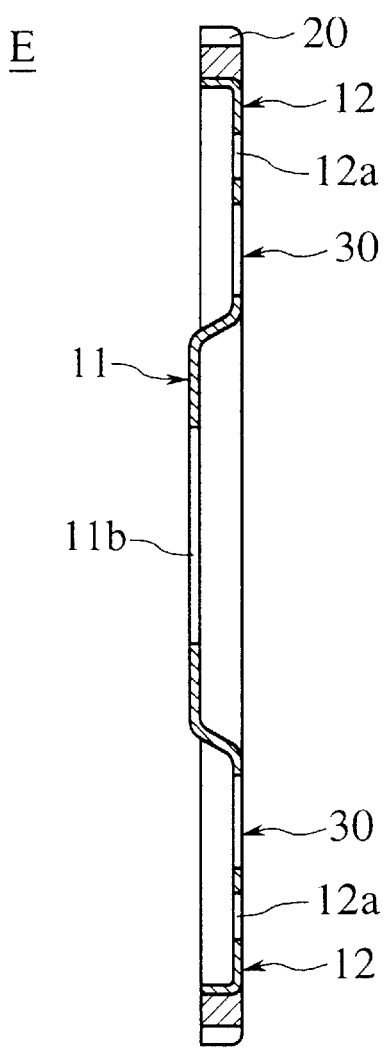
FIG. 5B is a cross-sectional view taken along the line VB—VB in FIG. 5A.

FIGS. 5A and 5B show a third embodiment of the drive plate E for an automotive vehicle according to the present invention. In this embodiment, the sectorial angle of each weight reducing hole 30 is formed wider along the circumferential direction, so that it is possible to further reduce the bending stress concentrated at the central portion of the drive plate E.

Further, in the respective embodiments described above, the outer annular gear 20 formed with gear teeth in the outer circumference thereof is first prepared. After that, the outer annular gear 20 is fixed integral with the outer circumferential of the body portion 10 by welding.

Figure 6A:
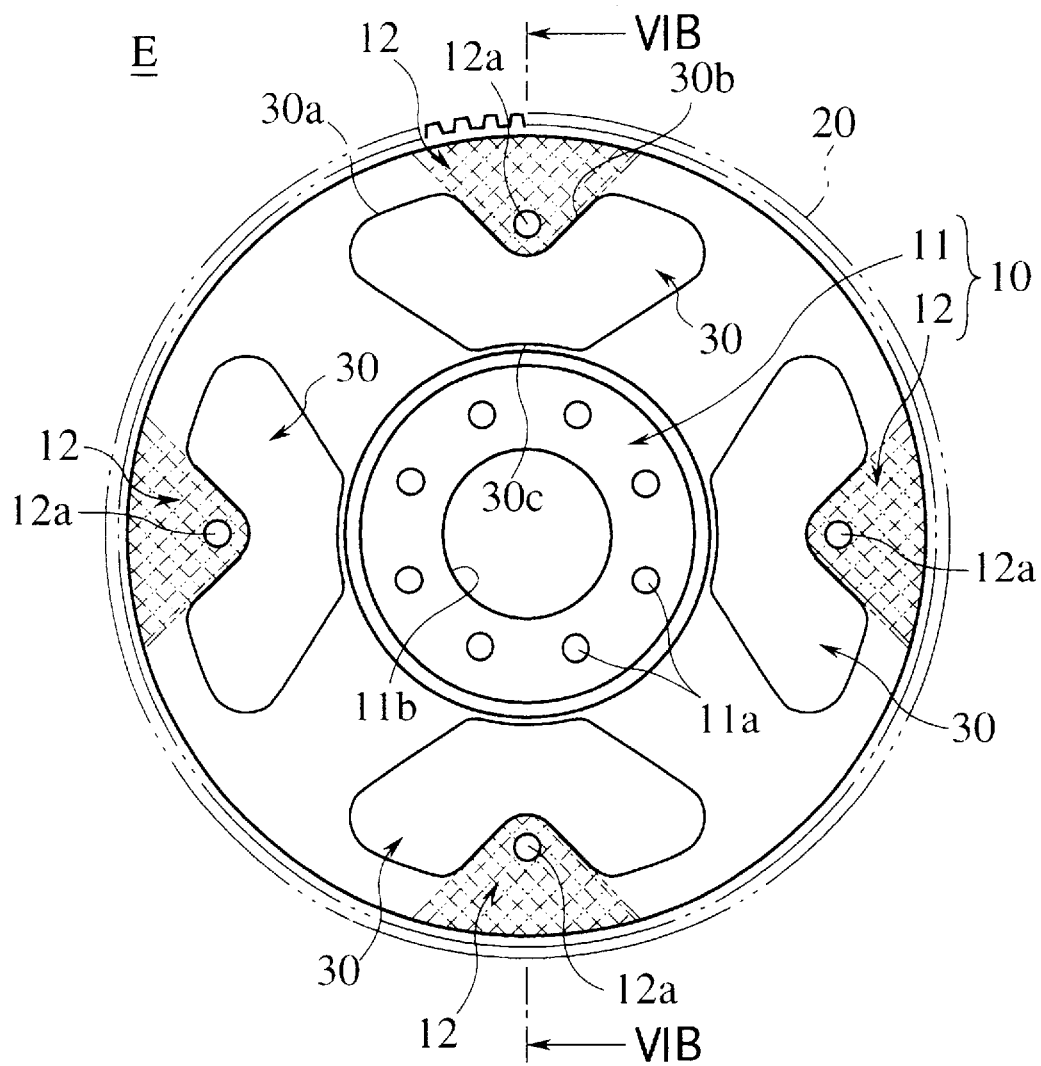
FIG. 6A is a front view showing a modification of the third embodiment of the drive plate for an automotive vehicle according to the present invention.
Figure 6B:
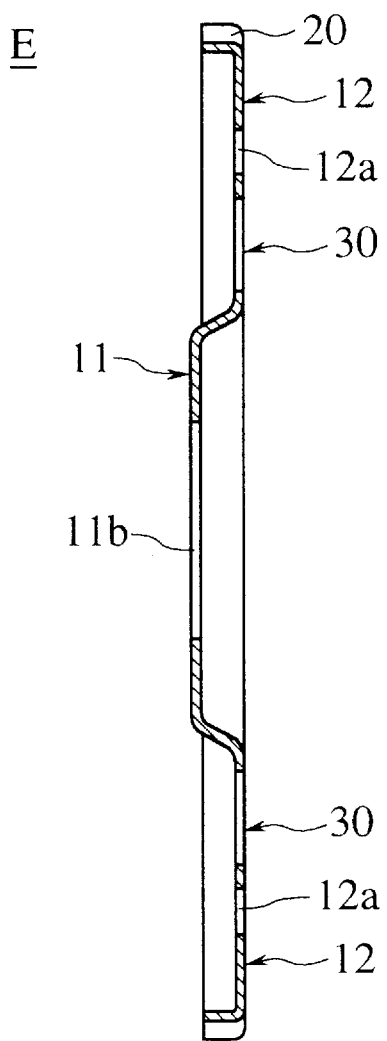
FIG. 6B is a cross-sectional view taken along the line VIB—VIB in FIG. 6A.

FIGS. 6A and 6B show a modification of the third embodiment, in which each innermost arc portion 30*c* of each weight reducing hole 30 is formed in close proximity to the central mount portion 11 for mounting the crankshaft. In this modification, since the bending stress generated at the central portion of the drive plate E can be further decentralized, it is possible to further reduce the bending stress concentrated at the drive plate E.

Further, in this modification, being different from the other embodiments, the body potion 10 and an outer annular portion which is expected to be the outer gear 20 are formed simultaneously at first. After that, the teeth of the outer gear 20 are formed in the outer circumference of the formed outer annular portion.

Further, in FIGS. 2A, 3A, 4A, 5A and 6A, the meshed (cross-hatched portions) are shown only for emphasis, so that the meshed portion 12 is flush with the adjoining portion, as shown in FIGS. 2B, 3B, 4B, 5B and 6B, respectively.

As described above, in the vehicle drive plate according to the present invention, since the deformation distance L1 can be increased by forming the converter mounting holes as radially outward as possible by best use of the weight reducing holes, when the converter mounting portion of the driver plate is deformed toward the crankshaft in the axial (thrust) direction thereof, it is possible to reduce the deflection angle as small as possible, so that the bending stress so far concentrated at the central mount hole for mounting the crankshaft can be reduced markedly, thus preventing the central mount portion of the drive plate from being damaged.

What is claimed is:

1. A drive plate for an automotive vehicle for transmitting a torque from a crankshaft to a torque converter to which the drive plate is attached, while absorbing a thrust load applied from the torque converter to the crankshaft, said drive plate comprising:

a drive plate body having a central plate portion for mounting the crankshaft, and an outer plate portion surrounding the central plate portion;

an outer gear formed on an outer periphery of the drive plate body;

a plurality of outer mounting portions associated with the outer plate portion with each mounting portion including an element for mounting the torque converter, said plurality of outer mounting portions being arranged in said outer plate portion at locations near the outer periphery of the drive plate body at regular intervals in a circumferential direction of the drive plate body;

a plurality of weight reducing holes formed in the outer plate portion at regular intervals in a circumferential direction of the outer plate portions;

the outer mounting portions corresponding in number to the weight reducing holes so that each and every weight reducing hole faces a corresponding one of the outer mounting portions, each said weight reducing hole having a sectorial shape having outer and inner arc portions;

said outer mounting portions and said weight reducing holes arranged radially symmetrically with respect to the center of the drive plate body without encountering any other hole in the outer plate portion;

said inner arc portion of each of the weight reducing holes being in close proximity to said central plate portion; and each outer mounting portion projecting in a radial direction from the outer gear into a corresponding weight reducing hole at a middle of a corresponding one of the outer arc portions of the weight reducing holes, so that the outer plate portion undergoes angular deflection relative to the central plate portion in response to a thrust load applied to the drive plate, thereby increasing the radius of bending deflection at the outer mounting portions and thus reducing the angle of deflection so as to reduce the bending stress concentrated at the central plate portion of the drive plate by the thrust load.

2. The drive plate of claim 1, wherein said outer gear is formed by directly engraving teeth in the outer periphery of said drive plate body simultaneously when said drive plate body is formed.

3. The drive plate of claim 1, wherein a width of each said weight reducing hole in a circumferential direction is wider than a width of each said weight reducing hole in a radial direction.

\* \* \* \* \*